United States Patent
Dolan et al.

(10) Patent No.: US 7,311,891 B2
(45) Date of Patent: Dec. 25, 2007

(54) PROCESS FOR THE RECOVERY OF SULFUR FROM CLAUS TAIL GAS STREAMS

(75) Inventors: William Bachop Dolan, Yardley, PA (US); John Warren Byrne, Edison, NJ (US); Michael John Mitariten, Pittstown, NJ (US); Kenneth Butwell, St. Lucie West, FL (US); Alfonse Maglio, River Edge, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 326 days.

(21) Appl. No.: 11/076,192

(22) Filed: Mar. 9, 2005

(65) Prior Publication Data
US 2006/0204432 A1    Sep. 14, 2006

(51) Int. Cl.
*C01B 17/04* (2006.01)
*C01B 17/50* (2006.01)

(52) U.S. Cl. .............. 423/573.1; 423/576.2; 423/576.8; 423/244.01; 423/244.02; 423/244.03; 423/244.04; 423/244.09; 423/244.1; 423/244.11; 423/539; 423/542

(58) Field of Classification Search .......... 423/573.1, 423/576.2, 576.8, 244.01, 244.02, 244.03, 423/244.04, 244.09, 244.1, 244.11, 539, 542; 502/517, 514
See application file for complete search history.

(56) References Cited

U.S. PATENT DOCUMENTS

| | | | |
|---|---|---|---|
| 3,764,665 A | 10/1973 | Groenendaal et al. | 423/574 |
| 3,892,677 A * | 7/1975 | Naber et al. | 502/55 |
| 4,233,276 A | 11/1980 | D'Souza et al. | 423/230 |
| 4,725,417 A * | 2/1988 | Deschamps et al. | 423/244.04 |
| 4,917,875 A * | 4/1990 | Moore et al. | 423/244.01 |
| 5,229,091 A * | 7/1993 | Buchanan et al. | 423/244.01 |
| 5,456,891 A * | 10/1995 | Fattinger et al. | 423/210 |
| 5,514,351 A | 5/1996 | Buchanan et al. | 423/220 |
| 5,676,921 A | 10/1997 | Heisel et al. | 423/573.1 |
| 5,741,469 A * | 4/1998 | Bhore et al. | 423/244.01 |
| 6,030,597 A | 2/2000 | Buchanan et al. | 423/573.1 |
| 6,042,803 A | 3/2000 | Watson | 423/574.1 |
| 6,506,349 B1 | 1/2003 | Khanmamedov | 423/210 |
| 6,610,264 B1 * | 8/2003 | Buchanan et al. | 423/242.1 |

* cited by examiner

*Primary Examiner*—Timothy C. Vanoy
(74) *Attorney, Agent, or Firm*—Raymond Keller

(57) ABSTRACT

Recovering sulfur from a gas stream containing hydrogen sulfide by oxidizing the gas stream to convert the hydrogen sulfide in the gas stream to sulfur oxide, and thus form a sulfur oxide enriched gas stream. The sulfur oxide enriched gas stream is contacted with a solid, sulfation resistant adsorbent bed at relatively low temperatures to extract the sulfur oxides and retain them as sulfur compounds, thus forming a sulfur oxide depleted gas stream. The adsorbent bed is then contacted with an inert or reducing gas stream to reduce the retained sulfur compounds to sulfur and/or sulfur dioxide and thereby form an enriched sulfur and/or sulfur dioxide bearing stream. The elemental sulfur is recovered and/or the sulfur dioxide bearing stream may be recycled to the Claus unit for further conversion.

18 Claims, 2 Drawing Sheets

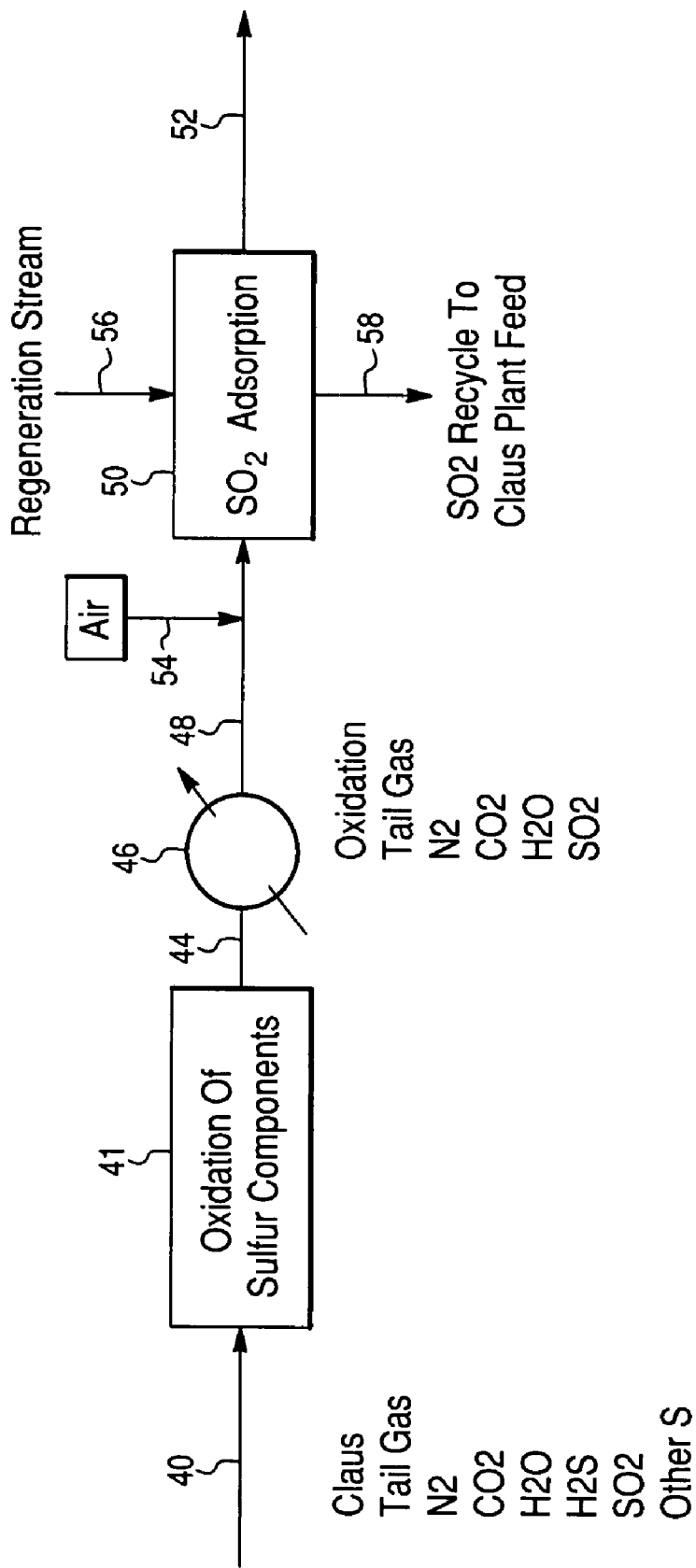

PROCESS FOR THE RECOVERY OF SULFUR FROM CLAUS TAIL GAS STREAMS

FIELD OF THE INVENTION

The present invention relates to a process for extracting sulfur from a gas stream containing hydrogen sulfide. More particularly, the present invention relates to a process for desulfurizing exhaust gas from a Claus unit using a solid adsorbent.

BACKGROUND OF THE INVENTION

Refinery and natural gas streams and are typically desulfurized by the Claus process wherein elemental sulfur is produced by reacting hydrogen sulfide and sulfur dioxide in the presence of a catalyst.

The Claus process was discovered over 115 years ago and has been employed by the natural gas and refinery industries to recover elemental sulfur from hydrogen sulfide-containing gas streams for the past 50 years. Briefly, the Claus process for producing elemental sulfur comprises two major sections. The first section is a thermal section where $H_2S$ is converted to elemental sulfur at approximately 1,800-2,200° F. No catalyst is present in the thermal section. The second section is a catalytic section where elemental sulfur is produced at temperatures between 400-650° F. over an alumina catalyst. The reaction to produce elemental sulfur is an equilibrium reaction; hence, there are several stages in the Claus process where separations are made in an effort to enhance the overall conversion of $H_2S$ to elemental sulfur. Each stage involves heating, reacting, cooling and separation.

In the thermal section of the conventional Claus plant, a stoichiometric amount of air is added to the furnace to oxidize approximately one-third of the $H_2S$ to $SO_2$ and also burn all the hydrocarbons and any ammonia ($NH_3$) present in the feed stream. The primary oxidation reaction is shown as follows:

$$2H_2S + 3O_2 \rightarrow 2SO_2 + 2H_2O \quad (1)$$

This reaction is highly exothermic and not limited by equilibrium. In the reaction furnace, the unconverted $H_2S$ reacts with the $SO_2$ to form elemental sulfur. This reaction is shown as follows:

$$2H_2S + SO_2 \leftrightarrows 3S^0 + 2H_2O \quad (2)$$

Reaction (2) is endothermic and is limited by equilibrium.

In the catalytic section of the Claus process, the unconverted hydrogen sulfide and sulfur dioxide from the thermal stage are converted to sulfur by the Claus reaction (2) over an alumina catalyst. Typically, there are three stages of catalytic conversions. Important features of the Claus reaction in the catalytic stage are that the reaction is equilibrium limited and that the equilibrium to elemental sulfur is favored at lower temperatures.

The Claus process was modified in 1938 by I. G. Fabenindustrie and various schemes of the modified process are utilized today. For feed gas streams containing approximately 40% $H_2S$, the balance carbon dioxide ($CO_2$) and water ($H_2O$), the once through Claus process is generally employed in which all of the acid gas is fed directly to the burner. Three catalytic stages are typically utilized after the initial thermal stage. This scheme will generally produce an overall recovery of 95-97% sulfur. If this recovery efficiency is acceptable, no further processing is required. However, if the recovery efficiency is not high enough (for a variety of reasons and, in particular, environmental constraints) an advanced Claus process such as Comprimo's Super Claus process which has a sulfur efficiency of 99.0% can be utilized. This process consists of the replacement of the final Claus reaction stage by, or the addition of, a reaction stage featuring a proprietary catalyst to promote the direct oxidation of hydrogen sulfide to sulfur selectively in the Claus tail-gas. Air is injected upstream of the reactor. The hydrogen sulfide and oxygen react over the catalyst via the following reaction:

$$2H_2S + O_2 \rightarrow 2S^0 + 2H_2O \quad (3)$$

If a sulfur recovery efficiency of greater than 99% is required, a tail-gas cleanup unit (TGCU) needs to be employed. This type of unit allows for an overall sulfur recovery efficiency of 99.8%. In the United States, a sulfur recovery efficiency of 99.8+% is required for Claus production units generating greater than or equal to 50 STSD of elemental sulfur, hence, a TGCU such as the Shell Scot process is often required. Such processes coupled with a sulfur recovery unit (SRU) can meet and exceed a sulfur recovery efficiency of 99.8+%.

The Shell Claus Off-gas Treating (SCOT) process for removing sulfur components from Claus plant tail gas was first brought on stream in 1973. Since then, the process has been widely used in the oil refining and natural gas industries, with more than 150 units constructed all over the world. In the standard SCOT process, sulfur compounds in Claus plant tail gas are catalytically converted into hydrogen sulfide. After cooling, the hydrogen sulfide is removed by solvent extraction. The SCOT off-gas (the gas not absorbed in the absorber) is incinerated.

The standard SCOT process is able to recover 99.9% of total sulfur, resulting in a 250 ppmv sulfur concentration in the SCOT off-gas. In recent years, the demand for higher sulfur recovery efficiencies has resulted in the development of two improved versions to the SCOT process. These are the Low-sulfur SCOT and the Super-Scot processes. The new processes lower the total sulfur content in the SCOT off-gas to less than 50 ppmv.

An after treatment process which oxidizes all sulfur compounds into $SO_2$ is disclosed in U.S. Pat. No. 3,764,665. This patent disclosed a process for removing sulfur oxides from gas mixtures with a solid acceptor for sulfur oxides wherein the solid acceptor is regenerated with a steam-diluted reducing gas and the regeneration off-gas is fed to a Claus sulfur recovery process. The patent provides for cooling the regeneration off-gas to condense the water vapor contained therein, contacting the cooled off-gas with a sulfur dioxide-selective liquid absorbent, passing the fat liquid absorbent to a buffer zone and then to a stripping zone wherein the absorbed $SO_2$ is recovered from the liquid absorbent and is supplied to the sulfur recovery process. By operating in this manner, fluctuations in the sulfur dioxide concentration of the regeneration off-gas were leveled-out and a relatively concentrated sulfur dioxide stream was supplied to the sulfur recovery process at a substantially constant rate. Although this process supplies relatively concentrated sulfur dioxide to the sulfur recovery process at a substantially constant rate, the off-gas must be cooled and the fat liquid absorbent must be transferred to a buffer zone before the absorbed $SO_2$ can be stripped. Therefore, what is needed is a simpler process whereby these steps are eliminated and energy costs reduced.

In the acceptance apparatus as described in U.S. Pat. No. 3,764,665, solid acceptors are used which are able to accept sulfur oxides and release them again in the form of sulfur dioxide on being regenerated. To this end, carbon-containing adsorbents are disclosed as useful. In this case the sulfur oxides are retained as sulfuric acid in the pores of the carbon adsorbent. After saturation of the adsorbent with sulfuric acid, the carbon-containing adsorbent can be thermally regenerated at 400° C. with the exclusion of oxygen. This yields a sulfur dioxide rich regeneration of off-gas which also contains carbon dioxide, nitrogen, and water vapor. The removal of sulfur compounds in the form of sulfur oxides, under oxidative conditions, i.e., in the presence of oxygen, is preferably affected at temperatures from 325° C. to 475° C. Regeneration under reductive conditions takes place in the same temperature range. Preferably, acceptance and regeneration are affected within this range at the same or virtually the same temperature. At the temperature of adsorption as disclosed in this patent, it is likely the carbon adsorbent is acting as a reducing agent and being consumed as $CO_2$, which is formed during regeneration of the adsorbent. Accordingly, continual replacement of the carbon adsorbent will be necessary.

U.S. Pat. No. 5,514,351 discloses a process of recovering sulfur from a Claus tail gas by forming a sulfur oxide enriched gas stream and contacting the sulfur oxide enriched gas stream with a solid adsorbent bed to extract the sulfur oxides and retain them as sulfur compounds, thus forming a sulfur oxide depleted stream. The sulfur compounds are retained in the bed in the form of inorganic sulfates, sulfur oxides or combinations thereof. The adsorbent bed is then contacted with a reducing gas stream to reduce the retained sulfur compounds to hydrogen sulfide and/or sulfur dioxide and thereby form a hydrogen sulfide and/or sulfur dioxide bearing stream. Sulfur is recovered from the hydrogen sulfide and/or sulfur dioxide bearing stream, and the sulfur oxide depleted stream may be sent to an incinerator or vented through a stack. While in the adsorbent mode, the adsorbent bed is at an elevated temperature of from about 900° F.-1,400° F. Similar to the previous patented process described immediately above, high temperature adsorption causes useful adsorbents such as carbon to react with and be consumed by the sulfur oxides, requiring significant and frequent replacement of the adsorbent.

The objective of this invention is to provide a lower cost solution to the recovery of sulfur from a Claus unit tail gas stream than possible using existing technology and the processes described in the above prior art patents. The current market leading solution for the recovery of sulfur from Claus tail gas streams is still the Shell SCOT process. Unfortunately, the Shell SCOT process costs approximately ½ to ⅓ the cost of the Claus plant itself. Accordingly, lower cost alternatives to the Shell SCOT unit to recover the last 5% of the sulfur leaving the Claus plant in the exhaust gas stream would be welcomed.

SUMMARY OF THE INVENTION

This invention is directed to a process for removing low concentrations of sulfur from a gas stream. In accordance with a broad aspect of the present invention, there is provided a method of recovering sulfur from a hydrogen sulfide containing gas stream, e.g., from an elemental sulfur recovery unit, comprising the steps of oxidizing the gas stream to convert the hydrogen sulfide therein to sulfur oxide, and thus form a sulfur oxide enriched gas stream. The sulfur oxide enriched gas stream is contacted at relatively low temperatures of about 90-250° C. with a solid, sulfation resistant adsorbent to extract the sulfur oxides and retain them as sulfur compounds, thus forming a sulfur oxide depleted stream. The sulfur compounds are believed retained in the bed in the form of sulfur oxides, sulfuric acid, combinations or complexes thereof. The adsorbent is then contacted with an inert or reducing gas stream to convert the retained sulfur compounds to sulfur and/or sulfur dioxide and thereby forms a sulfur dioxide bearing stream. The elemental sulfur is recovered and/or the sulfur dioxide bearing stream may be recycled to the Claus unit for further conversion.

BRIEF DESCRIPTION OF THE DRAWINGS

FIG. 2 is a schematic of the process of this invention used to treat the tail gas obtained from the Claus process;

DETAILED DESCRIPTION OF THE INVENTION

Figure 1:
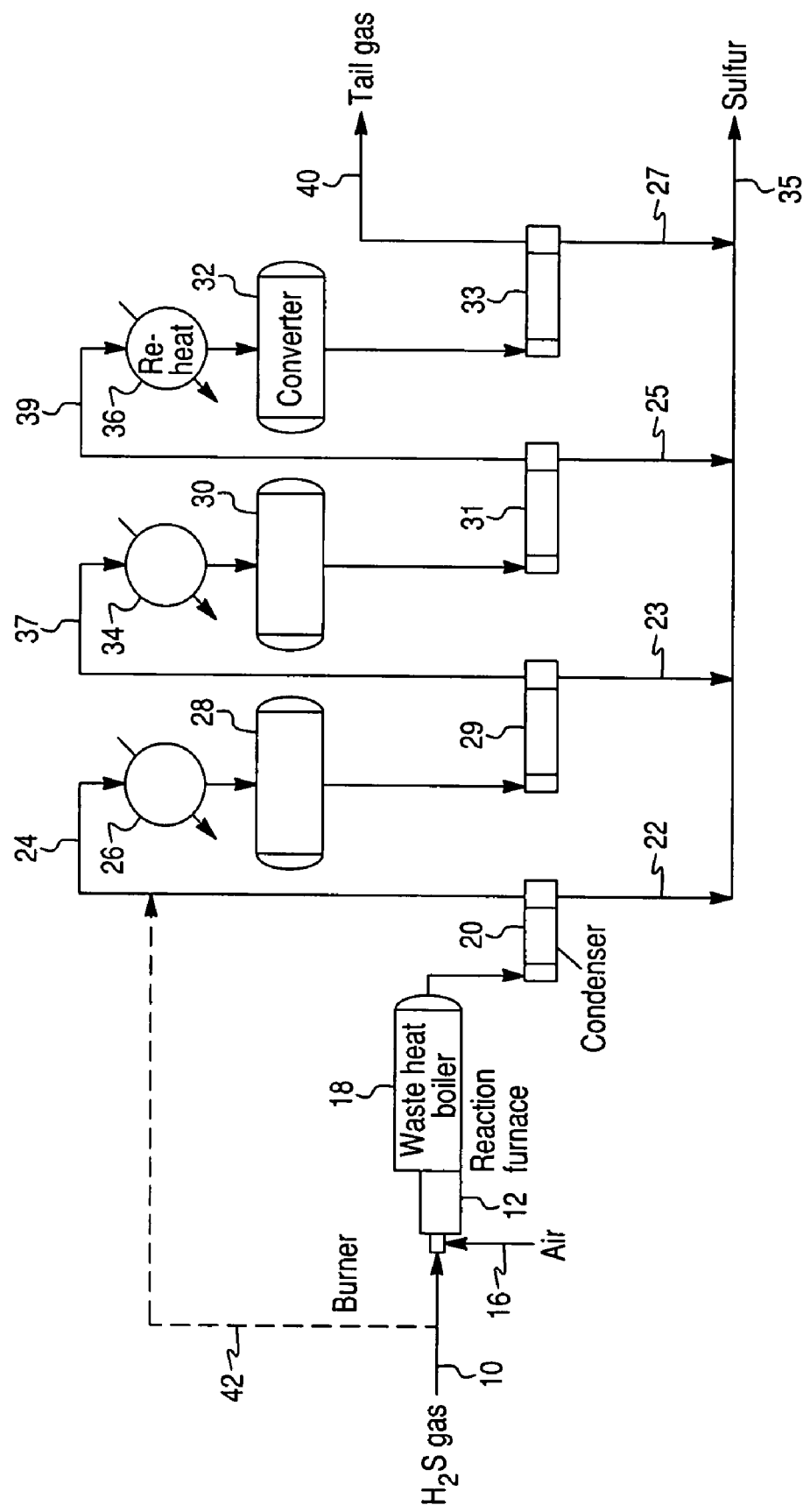
FIG. 1 is a schematic of the Claus process which shows both straight-through and split flow processing.

Claus feed gas typically has high concentrations of hydrogen sulfide, for example hydrogen sulfide concentrations of between 40% and 85% depending on plant and pretreatment processes. The pretreatment process may be an amine treater which provides a concentrated hydrogen sulfide output stream (acid gas).

A schematic of a typical three-stage Claus plant is shown in FIG. 1. The first step of the Claus process involves a controlled combustion of a feed gas which contains hydrogen sulfide and the noncatalytic reaction of unburned hydrogen sulfide with sulfur dioxide as depicted in reactions (1) and (2) above. In the straight through process, a feed gas containing hydrogen sulfide is directed via line 10 to reaction furnace 12 which contains a burner 14 where the feed gas is combusted. Oxygen is supplied to burner 14 by an air stream via line 16. From the reaction furnace 12, the products are cooled in a waste heat boiler 18 and the products condensed and separated in condenser 20 into a liquid sulfur stream 22 and gaseous product stream. Gaseous products are reheated via line 24 in reheater 26 and passed through a series of catalytic reactors 28, 30, and 32 wherein the unreacted hydrogen sulfide and sulfur dioxide react over a catalyst, typically alumina, to produce sulfur and water as depicted in reaction (2). Subsequent to each reaction, the reaction products are condensed in respective condensers 29, 31 and 33 wherein liquid sulfur is separated and removed via respective lines 23, 25 and 27 and joined with liquid sulfur from line 22 to form a final sulfur stream 35. Precedent to the respective catalytic reactions in reactors 30 and 32, the product gas directed from the preceding condensers 29 and 31 is reheated in respective reheaters 34 and 36 which receive the cooled gas stream via lines 37 and 39, respectively. Tail gas leaving condenser 33 via line 40 can be treated in accordance with this invention and as described below.

An alternative to the straight-through process is the split-flow process. In this process, 40-60% of the Claus feed bypasses the burner and is fed directly to the first catalytic stage. This process is shown in FIG. 1 wherein line 42 directs a portion of the $H_2S$-containing feed from line 10 into line 24 containing product gas from condenser 20. The mixed stream is heated in reheater 26 and passed to first stage catalytic reactor 28.

As shown in FIG. 2, the hydrogen sulfide-containing tail gas stream 40 from the elemental sulfur recovery unit or Claus process shown in FIG. 1 is processed in accordance with this invention to recover sulfur values which remain in the tail gas. While tail gas stream 40 can come directly from the Claus process, it is contemplated that the tail gas stream 40 can be generated from a tail gas cleanup unit (TGCU) to increase overall sulfur recovery. Tail gas stream 40 is fed to oxidation reactor 41 to completely convert hydrogen sulfide and other sulfur-containing compounds to sulfur oxides, e.g., $SO_2$. A temperature range of about 300 to 500° C. is used for the oxidation in reactor 41. A sulfur oxide enriched gas stream 44 from oxidation reactor 41 is cooled in heat exchanger 46 to within a range of from about 90° C. to about 250° C. and is fed via line 48 to a fixed-bed reactor 50 containing a solid adsorbent bed (not shown).

The solid adsorbent bed in reactor 50 adsorbs substantially all of the sulfur oxide from the sulfur oxide enriched gas stream 44, and provides a sulfur oxide depleted gas stream 52. The sulfur oxide depleted stream 52 can be fed to an incinerator or to a stack (not shown). Alternatively, a portion of gas stream 52 can be treated to remove oxygen and $CO_2$ and used to regenerate the adsorbent as described below.

While in an adsorbent mode, the reactor 50 is operated at a temperature of from about 90° C. to about 250° C. A temperature of from about 90° C. to about 150° C. is preferred, and from 90° C. to 125° C. more preferred. These relatively low temperatures are effective for adsorption of the sulfur oxides and, importantly, are not so high as to cause appreciable reaction between the sulfur oxides and some useful adsorbents such as carbon and result in the eventual consumption of the adsorbent. Further, it is believed that by adsorbing the $SO_2$ in the presence of water and oxygen a higher level of sulfur oxide can be adsorbed in the solid adsorbent bed. It is postulated that the $SO_2$ is adsorbed as $H_2SO_4$ most likely via reaction (4):

$$SO_2 + \tfrac{1}{2}O_2 + H_2O \rightarrow H_2SO_4 \tag{4}$$

The tail gas from line 40 and oxidation tail gas from line 48 will often contain sufficient water for reaction (4) without the need for water addition. Oxygen may, however, have to be added to stream 48 entering reactor 50. The oxygen content of the stream 48 entering the adsorbent bed 50 should be in an amount ranging from about 0.9 to 10 times the stoichiometric molar amount required in equation (4). Preferably, the oxygen content will range from about 1 to about 5 times the stoichiometric molar requirement. The amount of air or $O_2$ needed to meet the general requirements expressed above can be determined by measuring the sulfur content of the Claus tail gas stream 40. Any analytical instrument known for measuring gas phase components can be used. For example, a Model 880-NSL tail gas analyzer from Ametek Western Research, Paoli, Pa., is one such instrument. Air supplied by line 54 may be the source of the oxygen. Typically, a water content of 10-50 vol. %, more typically, 20-30 vol. % is found in the tail gas stream from the third stage of a Claus reactor. Water vapor can be supplied, for example, from an external source of steam if needed. Pressure within the reactor 50 should be maintained at approximately atmospheric pressure, up to 100 psia.

The adsorbent is most usefully present as a fixed bed in reactor 50 and can be in the form of balls, pebbles, spheres, extrudates, channeled monoliths, microspheres or pellets. A fluidized bed system is also possible with this invention wherein temperature and pressure conditions would remain similar to the fixed bed system. It is particularly important that the low temperatures of the fixed bed be used to avoid consumption of the adsorbent. The adsorbent provides absorbers or acceptors which absorb, and collect or otherwise remove sulfur oxides from the influent gaseous stream.

During regeneration of the adsorbent bed in reactor 50, the temperature is maintained at least about the adsorption temperature or higher, preferably between 150° C. to about 550° C. To protect reactor metallurgy, temperatures of from 150° C. to 260° C. are preferred. The pressure in the reactor 50 is maintained at about atmospheric pressure. On regeneration of the adsorbent bed, it is important that $SO_3/H_2SO_4$ not be formed or released as these components can be deleterious to reactor metallurgy. Accordingly, the regeneration gas stream 56 passed through the adsorbent bed should not contain $O_2$. An inert gas or reducing gas stream is therefore used to regenerate the bed. Preferably, a reducing gas is used, most preferably $H_2S$ since it is readily available.

As further shown in FIG. 2, the regenerating gas stream 56 is directed into the reactor 50 to liberate the adsorbed $SO_2$. A regeneration gas stream flow provided at a volume of gas sufficient to heat the adsorbent bed is used and whereby the exit of the bed in reactor 50 is within 50° C. of the inlet. Preferred gases for regeneration include nitrogen, hydrogen, $C_3$+ hydrocarbons, and hydrogen sulfide. The off-gas stream 52 stripped of any $O_2$ and containing $N_2$ and CO can also be used for regeneration. Combinations of inert gas and reducing gas can be used. Regeneration with a portion of the Claus plant feed 10 is also acceptable. Regeneration with $H_2S$ or a reducing gas stream containing $H_2S$ is preferred. When regenerating with $H_2S$, it has been found that only minimal, if any, amounts of $SO_3/H_2SO_4$ are released. Formation of elemental sulfur is observed, most likely occurring by reaction (5):

$$3H_2S + H_2SO_4 \rightarrow 4S + 4H_2O \tag{5}$$

If carbon is used as the adsorbent and $CO_2$ is present at the exit of the adsorber during adsorption or regeneration, this indicates that the carbon was acting as a reductant and, therefore, it is postulated that the carbon is being consumed most likely via reaction (6):

$$C + 2H_2SO_4 \rightarrow 2SO_2 + CO_2 + 2H_2O \tag{6}$$

The lower temperatures used during adsorption greatly minimize the formation of $CO_2$ and distinguish the process of this invention over the processes of U.S. Pat. Nos. 3,764,665 and 5,514,351 described above.

The invention contemplates that the regenerating gas 56 be back-flowed through the adsorbent bed in reactor 50 in a direction opposite the flow direction of the sulfur oxide enriched stream 48 through the bed. This would ensure that the last part of the bed that the sulfur oxide enriched stream sees is very active.

Regeneration of the adsorbent in reactor 50 provides sulfur and/or sulfur dioxide bearing stream through the outlet line 58. The sulfur dioxide-containing stream 58 can be recycled to the Claus plant and line 10 for further recovery of sulfur. The hydrogen sulfide and/or sulfur dioxide bearing stream may also contain water and unconverted reducing gas.

The adsorbents useful in this invention can be characterized as being sulfation resistant. In other words, the adsorbents will not react with the $SO_2$ to form sulfates on the adsorbent surface. Therefore, alumina and alumina-containing adsorbents such as alumina-containing clays, spinels, and silica-alumina products are not useful in this invention.

Non-limiting examples of suitable sulfation resistant solid adsorbents for use in the present invention include the porous solids, silica, natural and synthetic zeolites, activated carbon, titania, zirconia, titania-silica, and zirconia-silica.

The adsorbents can be impregnated or otherwise coated with at least one oxidizing catalyst or promoter that promotes the removal of nitrogen oxides, the oxidation of $SO_2$ to $SO_3$ in the presence of oxygen, and the regeneration of the sorbent. It is believed that $SO_3$ is more readily adsorbed than $SO_2$. One useful catalyst is ceria (cerium oxide). Another useful catalyst is platinum. Other catalytic metals, both free and in combined form, preferably as an oxide form, can be used, either alone or in combination with each other or in combination with ceria, such as rare earth metals, metals from Group 8 of the Periodic Table, chromium, vanadium, rhenium, tungsten, silver and combinations thereof. An even distribution of the promoter is preferred for best results and to minimize adsorbent erosion.

The specific amounts of the promoters included in the solid sorbent, if present at all, may vary widely. Preferably, the first promoter is present in an amount between about 0.001% to about 20% by weight, calculated as elemental metal, of the solid sorbent, and the second promoter is present in an amount between about 0.001% to about 10% by weight, calculated as elemental metal, of the solid sorbent. Preferably, the solid sorbent includes about 0.1% to about 20%, more preferably about 0.2% to about 20%, and still more preferably about 0.5% to about 15%, by weight of rare earth metal, calculated as elemental metal. Of course, if a platinum group metal is employed in the solid sorbent, very much reduced concentrations (e.g., in the parts per thousand to parts per million (ppm) range) are employed. If vanadium is included as the second promoter, it is preferably present in an amount of about 0.01% to about 7%, more preferably about 0.1% to about 5%, and still more preferably about 0.5% to about 2% by weight of vanadium, calculated as elemental metal.

The promoters may be associated with the solid sorbent using any suitable technique or combination of techniques; for example, impregnation, coprecipitation, ion-exchange and the like, well known in the art. Also, the promoters may be added during synthesis of the sorbent. Thus, the promoters may be an integral part of the solid sorbent or may be in a phase separate from the solid sorbent (e.g., deposited on the solid sorbent) or both. These metal components may be associated with the solid sorbent together or in any sequence or by the same or different association techniques. Cost considerations favor the preferred procedure in which the metal components are associated together with the sorbent. Impregnation may be carried out by contacting the sorbent with a solution, preferably an aqueous solution, of the metal salts.

It may not be necessary to wash the sorbent after certain soluble metal salts (such as nitrate, sulfate or acetate) are added. After impregnation with the metal salts, the sorbent can be dried and calcined to decompose the salts, forming an oxide in the case of a nitrate, sulfate or acetate.

The following examples are illustrative of adsorbents and process conditions useful to practice this invention. The scope of the invention, however, is to be determined from the appended claims.

EXAMPLE 1

The proposed mechanism for the adsorption of $SO_2$ on activated carbon in the presence of $O_2$ and $H_2O$ is the formation of an adsorbed sulfuric acid species, which is then thermally regenerated/reduced back to $SO_2$. To test this theory, two adsorbent samples were impregnated with sulfuric acid: (1) an activated carbon with 35% $H_2SO_4$ and (2) 1.9% Pt/ZSM-5 having a $SiO_2/Al_2O_3$ ratio of 270 with 20% $H_2SO_4$. Each acid loaded sample was placed in a column and then regenerated at 260° C. with wet $N_2$. The $SO_2/SO_3$ content of the off-gas was determined by wet analysis.

The loading for the activated carbon was 7.76 g (0.079 mol) of $H_2SO_4$ on 13.7 g of carbon. The $SO_2/SO_3$ split upon regeneration was determined to be 4.91 g $SO_2$ (0.077 mol) and 0.21 g of $SO_3$ (0.002 mol). Remarkably, 100% recovery of $SO_2/SO_3$ (0.079 mol) was achieved with the formation of only 4% of undesirable $SO_3/H_2SO_4$, a very favorable situation.

The loading for Pt/ZSM-5 was 6.76 g (0.069 mol) of $H_2SO_4$ on 25.6 g of adsorbent. The $SO_2/SO_3$ split upon regeneration couldn't be determined since the vent lines plugged up with a green solid. This negative result indicates that a significant amount of free sulfuric acid was liberated during regeneration and subsequently reacted with the metal lines. Unlike with the carbon adsorbent, this formation of undesirable $H_2SO_4/SO_3$ seen is a very unfavorable situation. Apparently, the structure/composition of activated carbon is more favorable for the reversible reactive adsorption of $SO_2$. It is also likely, that the carbon was sacrificed before the reactor metallurgy.

EXAMPLE 2

This example compares the impact of the feed components during adsorption. $SO_2$ adsorption was compared with and without $O_2$ or $H_2O$ present in the fuel. Breakthrough times (detection of $SO_2$ in exit gas) were normalized to 20.0 g:

Sample: 15.6 g (dry basis) of Norit®RO activated carbon (0.8 mm extrudates)
Adsorption Temp: 90° C.
Adsorption Pressure: 20 psia
Feed Flow: 73 sccm Duplicate $SO_2$ breakthrough tests on Norit®RO activated carbon using a feed stream containing 3,100 ppm $SO_2$, ~22% $CO_2$, ~22% $H_2O$, balance $N_2$ resulted in an average breakthrough time of 219 minutes. Results were significantly better with $O_2$ present as shown next. Breakthrough tests were repeated using a feed stream containing 3,100 ppm $SO_2$, 22% $CO_2$, 9,000 ppm $O_2$, ~22% $H_2O$, balance $N_2$. In this case no breakthrough of $SO_2$ was noted even after 2,880 minutes, the point at which the run was stopped. In the presence of $O_2$, loading of $SO_2$ was >11.9 wt % $SO_2$ (g/g ads.) as compared to 0.9% wt % $SO_2$ (g/g ads) without $O_2$ present. The sample was regenerated at 260° C. overnight with dry $N_2$ between each breakthrough test.

In order to determine the effect of water on the $SO_2$ capacity of the activated carbon, a dry $SO_2$ breakthrough test was then run on Norit®RO activated carbon using a feed stream containing 3,100 ppm $SO_2$, 22% $CO_2$, 9,000 ppm $O_2$, balance $N_2$. A significantly reduced $SO_2$ breakthrough time of 589 minutes resulted. Thus, in the presence of $O_2$ but no $H_2O$, $SO_2$ loading was to 2.4% wt % $SO_2$ (g/g ads.)

To more easily quantify the amount of $SO_2$ adsorbed on the Norit®RO activated carbon, a feed gas containing 5% $SO_2$, 5% $O_2$, ~22% $H_2O$, and balance $N_2$ was used. Even with this 16-fold increase in $SO_2$ concentration, the breakthrough time for $SO_2$ was still 1,042 min. This represents a ~50% wt. loading of $SO_2$. An analysis of the off-gas during subsequent regeneration indicated a reversible loss of $SO_2$ only. A survey of the literature confirms this result, i.e., activated carbons can pick up this amount of $SO_2$ when $H_2O$ and $O_2$ are present. The mechanism is reported to involve the reversible oxidation of $SO_2$ to $SO_3$ forming an "$H_2SO_4$" like complex with the $H_2O$ that releases only $SO_2$ upon regeneration. It is important in the process of this invention that little or no free acid be released during regeneration.

EXAMPLE 3

In this example, the impact of inert gas regeneration of the adsorbent was studied.

Regeneration with $N_2$ (9 cycle life test):
  Sample: 14.6 g (dry basis) of Norit®RO activated carbon (0.8 mm extrudates)
  Adsorption Temp: 90° C.
  Adsorption Pressure: 20 psia
  $SO_2$ adsorption steps were run with a feed containing 5% $SO_2$, 5% $O_2$, 24% $H_2O$, balance $N_2$ at 90° C. The feed flow was adjusted to 73 sccm so as to achieve a less than four hour breakthrough time. Regeneration steps were carried out at 260° C. with wet helium at 73 cc/min of He with 1 ml/min $H_2O$ for three hours. The final hour of the regeneration cycle was used for cooling the bed. Significant $CO_2$ was detected by the GC during regeneration. A GC scan of the regeneration off-gas from the 8$^{th}$ cycle showed that the production of $CO_2$ was directly associated with the release of $SO_2$. Integration of the peaks indicated a ~2.6/1 $SO_2/CO_2$ molar ratio. This ratio is consistent with carbon oxidation by the adsorbed sulfuric acid, i.e., $2H_2SO_4+C \rightarrow CO_2+2SO_2+2H_2O$, during thermal regeneration. It was also determined from peak integration that ~0.30 wt % of the carbon was lost per the eight hour adsorption/regeneration cycle. This would add up to an intolerable 30 wt % loss of carbon adsorbent per month.

EXAMPLE 4

The benefit of $H_2S$ regeneration is shown in this example. Regeneration with $H_2S$ was provided in a 17 cycle life test.
  Sample: 14.7 g (dry basis) Norit®RO activated carbon (0.8 mm extrudates)
  Adsorption Temp: 90° C.
  Adsorption Pressure: 20 psia
  Feed Flow: 73 sccm
  $SO_2$ adsorption steps were run with 5% $SO_2$, 5% O2, 24% $H_2O$, balance $N_2$ at 90° C. and 50 cc/min. Regeneration steps were carried out at 400° C. with wet $H_2S$ at 50 cc/min of $H_2S$ with 1 ml/min $H_2O$. No $CO_2$ or $SO_2$ was detected by the GC during regeneration. However the formation of sulfur was noted. Based on the GC detection limit, no more than a 12% annual loss of carbon would be expected. This result is consistent with the reaction of $H_2S$ with the adsorbed sulfuric acid, i.e., $3H_2S+H_2SO_4 \rightarrow 4S+4H_2O$, during thermal reaction. In addition, no loss in $SO_2$ capacity was noted after the 17 cycles.

EXAMPLE 5

In this example, the impact of adsorption temperature was measured using a 3 cycle test.
  Sample: Darco® activated carbon (4/12 mesh granules)
  Sample Wt: 13.8 g at 90° C./14.3 g at 150° C./15.8 g at 200° C. (dry basis)
  Adsorption Pressure: 20 psia
  Feed Flow: 73 sccm $SO_2$ adsorption steps were run with 5% $SO_2$, 5% $O_2$, 24% $H_2O$, balance $N_2$, at the temperatures noted above and a gas flow of 73 cc/min. Regeneration steps were carried out at 260° C. with wet He at 73 cc/min of He with 1 ml/min $H_2O$. A significant and undesirable reduction in performance was noted when the adsorption temperature was raised from 90° C. to 200° C. (~85% loss after three cycles) and even to 150° C. (~50% loss after 3 cycles). The loss in performance is undoubtedly correlated with the undesirable combustion of the activated carbon at the elevated adsorption temperatures of 150° C. and 200° C., as evidenced by $CO_2$ detection using GC analytical methods.

What is claimed is:

1. A method of recovering sulfur from a tail gas stream containing hydrogen sulfide and obtained from a sulfur recovery unit comprising the steps of:
   (a) adding air or oxygen to said tail gas stream containing hydrogen sulfide;
   (b) oxidizing said hydrogen sulfide to convert the hydrogen sulfide in said tail gas stream to a sulfur oxide, the air or oxygen being added in an amount to support conversion of all the hydrogen sulfide in said tail gas stream to sulfur oxide, and thereby form a sulfur oxide enriched gas stream;
   (c) contacting said sulfur oxide enriched gas stream with a solid sulfation resistant adsorbent bed at a temperature of 90-150° C. for adsorbing thereon the sulfur oxides and thereby form a sulfur oxide depleted stream;
   (d) contacting said adsorbent bed with a stream of an inert gas, reducing gas or mixture thereof to regenerate said adsorbent bed and form elemental sulfur and/or sulfur dioxide; and
   (e) recovering said elemental sulfur and/or sulfur dioxide.

2. The method of claim 1 wherein said tail gas stream containing hydrogen sulfide is oxidized at a temperature of from about 150 to about 550° C.

3. The method of claim 1 wherein said reducing gas stream to regenerate said adsorbent bed is $C_{3+}$ hydrocarbons, hydrogen sulfide, carbon monoxide, nitrogen, hydrogen or mixtures thereof.

4. The method of claim 3 wherein said reducing gas stream is hydrogen sulfide.

5. The method of claim 1 wherein said inert gas stream is used to regenerate said adsorbent bed.

6. The method of claim 1 wherein said sulfur oxide enriched stream contacting said solid adsorbent bed has an oxygen content ranging from about 0.9 to 10 times the stoichiometric molar requirement of the equation $$SO_2 + \tfrac{1}{2}O_2 + H_2O = H_2SO4.$$

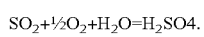

7. The method of claim 6 wherein the oxygen content is from 1 to about 5 times the stoichiometric molar excess required by said equation.

8. The process of claim 7 wherein said sulfur oxide enriched stream contacting said adsorbent includes water.

9. The process of claim 6 wherein said sulfur oxide enriched stream contacting said adsorbent includes water.

10. The method of claim 9, wherein said sulfur oxide enriched stream has a water content of 10 to 50 vol %.

11. The method of claim 1 wherein the pressure during contacting step (c) is from about 15 to 100 psia.

12. The method of claim 1 wherein said temperature is from about 90° C. to about 125° C.

13. The method of claim 1 wherein said solid sulfation resistant adsorbent is selected from activated carbon, silica, natural and synthetic zeolites, titania, zirconia, titania-silica, and zirconia-silica.

14. The method of claim 13 wherein said solid sulfation resistant adsorbent is activated carbon.

15. The method of claim 13 wherein said solid sulfation resistant adsorbent is a synthetic zeolite.

16. The method of claim 15 wherein said synthetic zeolite is ZSM-5.

17. The method of claim 13 wherein said solid sulfation resistant adsorbent includes an oxidation promoter.

18. The method of claim 1 wherein said tail gas is from a Claus plant.

* * * * *